3,161,641
PYRIMETHAMINE SALT WITH FLUORESCEIN
Edward F. Elslager and Donald F. Worth, Ann Arbor, Mich., assignors to Parke, Davis & Company, Detroit, Mich., a corporation of Michigan
No Drawing. Filed Apr. 20, 1962, Ser. No. 188,984
1 Claim. (Cl. 260—256.4)

The present invention relates to salts of 2,4-diamino-5-(p-chlorophenyl)-6-ethylpyrimidine with an acid of the formula

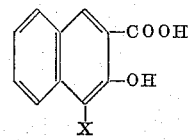

where X represents a 5'-methylene(6'-hydroxy-2'-naphthoic acid), 4'-methylene(1'-hydroxy-2'-naphthoic acid), 4'-(3'-hydroxy-2'-naphthoic acid), 4'-benzylidene(3'-hydroxy-2'-naphthoic acid), or 4'-ethylidene(3'-hydroxy-2'-naphthoic acid) radical; with an acid of formula

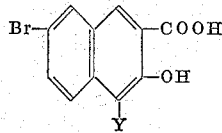

where Y represents a 4'-(7'-bromo-3'-hydroxy-2'-naphthoic acid), 4'-methylene(7'-bromo-3'-hydroxy-2'-naphthoic acid), 4'-methylene(3'-hydroxy-2'-naphthoic acid), 4'-methylene-(1'-hydroxy-2'-naphthoic acid) or 5'-methylene-6'-hydroxy-2'-naphthoic acid) radical; with an acid of formula

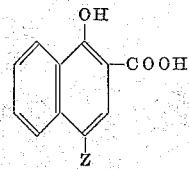

where Z represents a 4'-(1'-hydroxy-2'-naphthoic acid), 4'-methylene(1'-hydroxy-2'-naphthoic acid) or 4'-benzylidene(1'-hydroxy-2'-naphthoic acid) radical; with an acid of formula

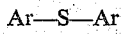

Ar—S—Ar where Ar represents a 4-(3-hydroxy-2-naphthoic acid) radical; with an acid of formula Ar—So₂—Ar where Ar represents a 5-(2-hydroxy-benzoic acid) radical; with an acid of formula

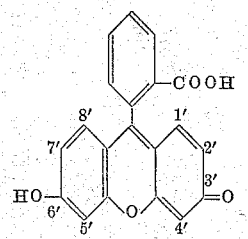

which can be substituted in the 2', 4', 5' or 7' positions with one or more halogen atoms or nitro groups; with an acid of formula

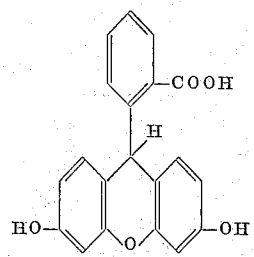

with an acid of formula

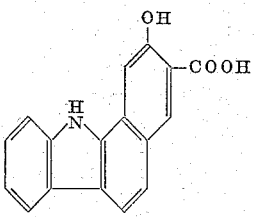

with an acid of formula

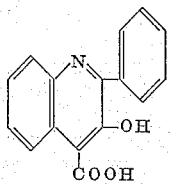

or with an acid of formula

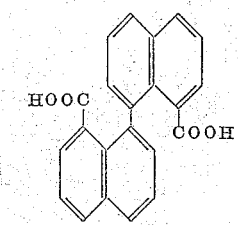

and to methods for their production. As used in the foregoing definitions, "halogen" designates a fluorine, chlorine, bromine or iodine atom.

The compounds of the invention are produced by reacting 2,4-diamino-5-(p-chlorophenyl)-6-ethylpyrimidine with the appropriate acid mentioned above; or by reacting a soluble salt of 2,4-diamino-5-(p-chlorophenyl)-6-ethylpyrimidine with a soluble salt of the appropriate acid. The term "soluble salt" is used herein in a relative sense and means a degree of solubility substantially greater than that exhibited by the products of the invention. Representative soluble salts of the pyrimidine base suitable for use in the process of the invention include the hydrochloride, hydrobromide, hydriodide, sulfate, phosphate, sulfamate, acetate, lactate, tartrate, gluconate, citrate, and salicylate. Representative soluble salts of the acids described above suitable for use in the process of the invention include the alkali metal, alkaline earth metal, ammonium and amine salts. The invention comprehends the starting materials and final products in their hydrated as well as anhydrous forms. If desired, the starting materials used in the process can be converted in situ to the desired base, acid, or soluble salt form by treatment with an acid or base, as by neutralizing one or more of the carboxyl groups with base, by treatment of a carboxylate salt with a mineral acid, by treatment of an acid-addition salt with a base, or by treatment of the pyrimidine base with an acid. The process of the invention is preferably carried out in a solvent in which the reactants are at least partially soluble and which is relatively unreactive toward each of the reactants. Suitable solvents include water, aqueous alkanols, dimethylacetamide, acetonitrile and mixtures thereof. Other satisfactory reaction media can be chosen from among a wide variety of solvents, particularly those which are neutral and polar. The salt formation proceeds fairly rapidly upon mixing the reactants in the selected solvent. The process can be carried out at room temperature or below, although in many cases a high yield and a crystalline form conducive to rapid filtration are facilitated by heating the reaction mixture for up to about an hour and then chilling it. The reactants are customarily employed in approximately the same ratio in which they appear in the desired final product. With the pyrimidine salts of monobasic acids approximately equimolar quantities are used. If it is desired to obtain the salt of the pyrimidine base with one-half formula weight of a dibasic acid it is customary to employ these reactants or soluble salts thereof in the ratio of 2 moles of the former to 1 mole of the latter. If it is desired to obtain the salt of the pyrimidine base with one formula weight of the dibasic acid best results are obtained by reacting a soluble salt of the pyrimidine base with an equimolar quantity of a soluble salt (such as the disodium salt) of the appropriate acid in the presence of one equivalent of a mineral acid. In those cases where the reaction product precipitates directly it is isolated by filtration or centrifugation. In those instances where it does not precipitate directly it is first made insoluble by concentration of the reaction mixture or by dilution of the reaction mixture with a solvent in which the product is insoluble, and then collected.

The products of the invention are antimalarial agents exhibiting especially long duration of action. It is known that 2,4 - diamino - 5 - (p - chlorophenyl) - 6 - ethylpyrimidine, otherwise known as pyrimethamine, is an antimalarial drug and is highly active against erythrocytic parasites. However, for collective prophylaxis the usual recommended adult dose is 25 mg. administered once a week. For large scale malaria eradication programs it is impractical to administer an antimalarial agent on such a frequent schedule. However, the compounds of the present invention possess the high antimalarial activity of 2,4-diamino-5-(p-chlorophenyl)-6-ethylpyrimidine, are non-irritating upon injection, and exhibit unusually long duration of action, thereby making it possible to extend the dosage interval from one week to as long as several months. The products of the invention can be formulated into suspensions which are pharmaceutically acceptable for inramuscular injection, using suspending vehicles such as 40% benzyl benzoate and 60% castor oil, or water containing emulsifying or dispersing agents.

Preferred compounds of the invention are the salts of 2,4-diamino-5-(p-chlorophenyl)-6-ethylpyrimidine with 4,4'-dihydroxy(1,1'-binaphthalene)-3,3'-dicarboxylic acid, 4,4'-thiobis(3-hydroxy-2-naphthoic acid), 5,5'-sulfonyldisalicylic acid, 2-hydroxy - 11H - benzo[a]carbazole-3-carboxylic acid, 3-hydroxycinchophen, and salts with an acid of formula

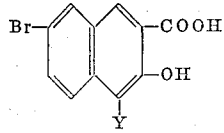

wherein Y has the foregoing significance. Salts of 2,4-diamino-5-(p-chlorophenyl)-6-ethylpyrimidine with fluorescin and the fluorescein compounds defined above are highly fluorescent and are of particular interest because they afford a simple method for the estimation and determination of drug levels in the urine, tissues and body fluids.

The invention is illustrated but not limited by the following examples.

Example 1

A solution of 0.752 g. (0.00201 mole) of 2,2'-dihydroxy-(1,1'-binaphthalene)-3,3'-dicarboxylic acid in 100 ml. of methanol is poured into a solution of 1.00 g. (0.00402 mole) of 2,4 - diamino-5-(p-chlorophenyl)-6-ethylpyrimidine in 100 ml. of warm methanol. Upon cooling, the precipitate is collected by filtration and dried. The crude salt is crystallized from a mixture of dimethylacetamide and water and is dried in vacuo at 65° C. to give the desired 2,4-diamino-5-(p-chlorophenyl)-6-ethylpyrimidine, salt with ½ formula weight of 2,2'-dihydroxy (1,1'-binaphthalene)-3,3'-dicarboxylic acid, ¼ hydrate, of formula

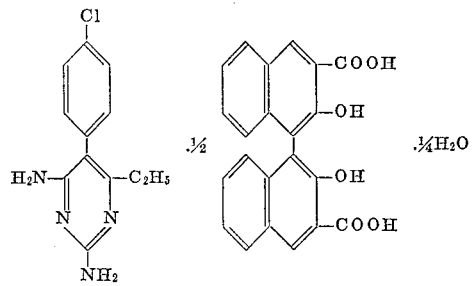

as pale yellow crystals, M.P. 286–287° C. (dec.).

Example 2

A solution of 1.13 g. (0.00302 mole) of 4,4'-dihydroxy-(1,1'-binaphthalene)-3,3'-dicarboxylic acid in 30 ml. of hot dimethylformamide is added to a solution of 1.5 g. (0.00604 mole) of 2,4-diamino-5-(p-chlorophenyl)-6-ethylpyrimidine in 200 ml. of boiling methanol. Upon cooling, the precipitate is collected by filtration and dried. The crude salt is crystallized from a mixture of dimethylacetamide and water and dried in vacuo at 65° C. The desired 2,4-diamino-5-(p-chlorophenyl)-6-ethylpyrimidine, salt with ½ formula weight of 4,4'-dihydroxy-(1,1'-binaphthalene)-3,3'-dicarboxylic acid, of formula

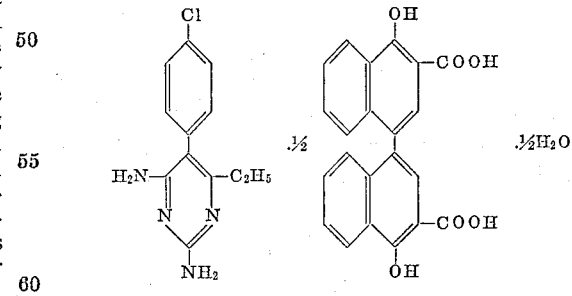

is obtained as the hemihydrate, gray-beige crystals, M.P. 210° C. (dec.).

4,4' - dihydroxy - (1,1'-binaphthalene)-3,3'-dicarboxylic acid, employed as a starting material in the above procedure, is prepared as follows: to a hot solution of 131.6 g. (0.7 mole) of 1-hydroxy-2-naphthoic acid in 1.5 l. of water containing 28 g. (0.7 mole) of sodium hydroxide is added dropwise at reflux temperature with stirring a solution of 340.7 g. (2.1 mole) of ferric chloride in 1.4 l. of water. After the addition is complete, the reaction mixture is stirred and boiled under reflux for one-half hour and filtered while warm. The filter cake is washed with water and is then stirred for one hour on the steam bath with 1.3 l. of 1:1 hydrochloric acid. The crude product is collected by filtration, washed with water, dried, and slurried with 800 ml. of hot chloroform. The residue is collected by filtration, washed successively with chloroform and ether, and dried. The desired acid is dissolved in 5% potassium hydroxide solution, filtered, the filtrate acidified, and the solid collected by filtration. Crystallization from a dimethylformamide-water mixture gives the desired 4,4'-dihydroxy-(1,1'-binaphthalene)-3,3'-dicarboxylic acid as off-white crystals, M.P. 292° C. (dec.).

Example 3

A solution of 1.86 g. (0.00402 mole) of 4,4'-benzylidenebis-(3-hydroxy-2-naphthoic acid) in 200 ml. of ethanol was added to a solution of 2.00 g. (0.00804 mole) of 2,4-diamino-5-(p-chlorophenyl)-6-ethylpyrimidine in 200 ml. of warm methanol. Upon cooling, the precipitate is collected by filtration and dried in vacuo at 65° C. for 18 hours. Crystallization from an ethanol-water mixture gives the desired 2,4-diamino-5-(p-chlorophenyl)-6-ethylpyrimidine, salt with ½ formula weight of 4,4'-benzylidenebis(3-hydroxy-2-naphthoic acid), ¼ hydrate, of formula

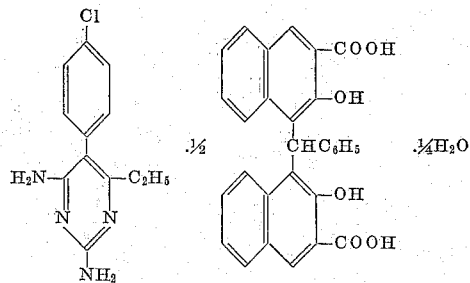

as pale yellow crystals, M.P. 200–203° C.

Example 4

A solution of 1.33 g. (0.0025 mole) of 6,6'-dibromo-2,2'-dihydroxy (1,1-binaphthalene)-3,3'-dicarboxylic acid in 100 ml. of hot methanol is added to a solution of 1.24 g. (0.0050 mole) of 2,4-diamino-5-(p-chlorophenyl)-6-ethylpyrimidine in 100 ml. of hot methanol. The crystalline salt is collected by filtration, washed with methanol and dried in vacuo at 75° C. This is the desired 2,4-diamino-5-(p-chlorophenyl)-6-ethylpyrimidine, salt with ½ formula weight of 6,6'-dibromo-2,2'-dihydroxy (1,1'-binaphthalene)-3,3'-dicarboxylic acid, monohydrate, of formula

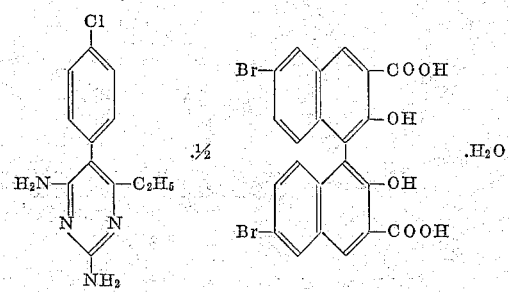

pale yellow crystals, M.P. 305–315° C. (dec.).

6,6'-dibromo-2,2'-dihydroxy(1,1'-binaphthalene)-3,3'-dicarboxylic acid, employed as a starting material in the above procedure, is prepared as follows: to a solution of 4.4 g. (0.11 mole) of sodium hydroxide and 29.4 g. (0.11 mole) of 7-bromo-3-hydroxy-2-naphthoic acid in 850 ml. of boiling water is added dropwise a solution of 33 g. (0.12 mole) of ferric chloride hexahydrate in 70 ml. of water. The reaction mixture is stirred and boiled under reflux for 30 minutes, filtered, and the precipitate stirred with 2 l. of 18% hydrochloric acid on the steam bath for 1 hour. The yellow-green solid is collected by filtration, washed thoroughly with water and dried in vacuo at 45° C. Crystallization of the crude acid from an ethanol-water mixture gives the desired 6,6'-dibromo-2,2'-dihydroxy(1,1'-binaphthalene)-3,3'-dicarboxylic acid as yellow crystals, M.P. 357° C. (dec.).

Example 5

A solution of 1.36 g. (0.0025 mole) of 4,4'-methylenebis-(7-bromo-3-hydroxy-2-naphthoic acid) in 25 ml. of dimethylacetamide is poured into a solution of 1.24 g. (0.0050 mole) of 2,4-diamino-5-(p-chlorophenyl)-6-ethylpyrimidine in 200 ml. of hot methanol. Upon cooling, the precipitate is collected by filtration, slurried with warm methanol, and dried at 75° C. in vacuo. This is the desired 2,4-diamino-5-(p-chlorophenyl)-6-ethylpyrimidine, salt with ½ formula weight of 4,4'-methylenebis(7-bromo-3-hydroxy-2-naphthoic acid), monohydrate, of formula

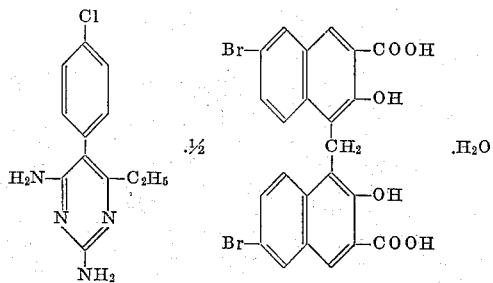

pale yellow crystals, M.P. 260–262° C.

4,4'-methylenebis(7-bromo-3-hydroxy-2-naphthoic acid), employed as an intermediate in the above preparation, is prepared as follows: a mixture of 26.7 g. (0.10 mole) of 7-bromo-3-hydroxy-2-naphthoic acid, 6.0 g. (0.15 mole) of sodium hydroxide and 700 ml. of water is heated to 90° C. on the steam bath and 6.0 ml. (0.075 mole) of 40% formaldehyde solution is added. The resulting light brown solution is stirred and heated on the steam bath for 2 hours and cooled. The precipitate is collected by filtration, dissolved in hot water, filtered, and the filtrate acidified with hydrochloric acid. The precipitate is collected by filtration and dried in vacuo at 65° C. The bright yellow solid thus obtained is the desired 4,4'-methylenebis-(7-bromo-3-hydroxy-2-naphthoic acid), M.P. 330–335° C. (dec.).

Example 6

A solution of 0.808 g. (0.00201 mole) of 4,4'-thiobis(3-hydroxy-2-naphthoic acid) in 100 ml. of water containing 4.0 ml. of 1 N sodium hydroxide solution is poured with stirring into a solution of 1.00 g. (0.00402 mole) of 2,4-diamino-5-(p-chlorophenyl)-6-ethylpyrimidine in 100 ml. of methanol and 4.0 ml. of 1 N hydrochloric acid. Upon cooling, the precipitate is collected by filtration, washed thoroughly with water and dried. Crystallization of the crude salt from an acetone-water mixture gives the desired 2,4-diamino-5-(p-chlorophenyl)-6-ethylpyrimidine, salt with ½ formula weight of 4,4'-thiobis(3-hydroxy-2-naphthoic acid), hydrate of formula

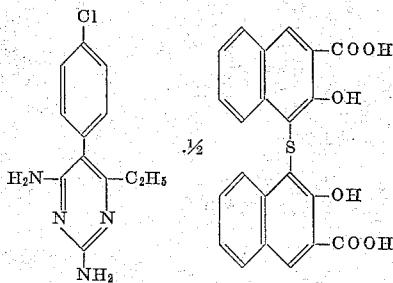

as yellow crystals, M.P. 220° C. (dec.).

Example 7

A solution of 0.680 g. (0.00201 mole) 5,5'-sulfonyldisalicyclic acid in 100 ml. of methanol is added to 1.00 g. (0.00402 mole) of 2,4-diamino-5-(p-chlorophenyl)-6- ethylpyrimidine in 100 ml. of methanol. The resulting methanol solution is concentrated to dryness in vacuo and the residue is crystallized from a methanol-water mixture. The pale yellow solid thus obtained, M.P. 247–248° C., is the desired 2,4-diamino-5-(p-chlorophenyl)-6-ethylpyrimidine, salt with ½ formula weight of 5,5'-sulfonyldisalicyclic acid, of formula

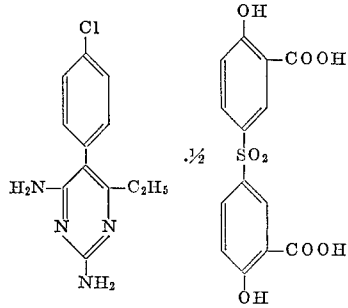

*Example 8*

A solution of 0.83 g. (0.0025 mole) of fluorescein in 25 ml. of hot dimethylacetamide is added to a solution of 1.24 g. (0.0050 mole) of 2,4-diamino-5-(p-chlorophenyl)-6-ethylpyrimidine in 125 ml. of warm methanol. Upon cooling, the precipitate is collected by filtration and dried. The crude salt is crystallized from a mixture of dimethylacetamide and water and is dried in vacuo at 75° C. 2,4-diamino-5-(p-chlorophenyl)-6-ethylpyrimidine, salt with 1 formula weight of fluorescein, of formula

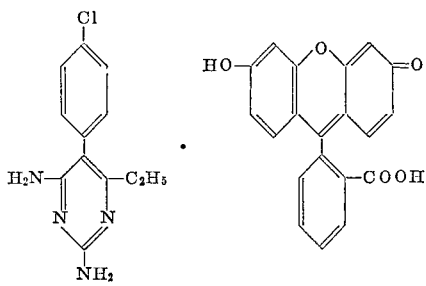

is obtained as orange crystals, M.P. 301–305° C. (dec.).

*Example 9*

A solution of 1.39 g. (0.0050 mole) of 2-hydroxy-11H-benzo[a]carbazole-3-carboxylic acid in 25 ml. of hot dimethylacetamide is added to a warm solution of 1.24 g. (0.0050 mole) of 2,4-diamino-5-(p-chlorophenyl)-6-ethylpyrimidine in 100 ml. of methanol. Hot water (150 ml.) is added and the salt is allowed to crystallize. The product is collected by filtration, dried and crystallized from an acetone-water mixture. The tan crystals thus obtained are the desired 2,4-diamino-5-(p-chlorophenyl)-6-ethylpyrimidine, salt with 1 formula weight of 2-hydroxy-11H-benzo[a]carbazole-3-carboxylic acid, M.P. 289–295° C. (dec.).

*Example 10*

A solution of 1.33 g. (0.0050 mole) of 3-hydroxycinchophen in 25 ml. of hot dimethylacetamide is added to a hot solution of 1.24 g. (0.0050 mole) of 2,4-diamino-5-(p-chlorophenyl)-6-ethylpyrimidine in 100 ml. of methanol. Upon cooling, the crude salt is collected by filtration and dried. Crystallization of the product from 75% aqueous dimethylacetamide followed by drying in vacuo at 70° C. gives the desired 2,4-diamino-5-(p-chlorophenyl)-6-ethylpyrimidine, salt with 1 formula weight of 3-hydroxy-cinchophen, 1 formula weight of N,N-dimethylacetamide of crystallization, as pale yellow crystals, M.P. 208–210° C. (dec.).

*Example 11*

A solution of 0.86 g. (0.0025 mole) of (1,1'-binaphthalene)-8,8'-dicarboxylic acid in 25 ml. of hot dimethylacetamide is poured into a solution of 0.62 g. (0.0025 mole) of 2,4-diamino-5-(p-chlorophenyl)-6-ethylpyrimidine in 50 ml. of hot methanol. The reaction mixture is diluted with 400 ml. of hot water and allowed to cool. The solid that separates is collected by filtration, washed with water and dried in vacuo at 65° C. Crystallization from a mixture of ethanol, methanol and water gives the desired 2,4-diamino-5-(p-chlorophenyl)-6-ethylpyrimidine, salt with 1 formula weight of (1,1'-binaphthalene)-8,8'-dicarboxylic acid, hemihydrate, as off-white crystals, M.P. 278–279° C.

*Example 12*

A solution of 0.97 g. (0.0025 mole) of 4,4'-methylene-bis(1-hydroxy-2-napthoic acid) in 150 ml. of methanol and 5 ml. (0.05 mole) of 1 N sodium hydroxide solution is added to a solution of 1.24 g. (0.005 mole) of 2,4-diamino-5-(p-chlorophenyl)-6-ethylpyrimidine in 250 ml. of hot methanol containing 5 ml. (0.005 mole) of 1 N hydrochloric acid solution. The colorless needles that separate are collected by filtration, washed with methanol and dried in vacuo at 65° C. This is the desired 2,4-diamino-5-(p-chlorophenyl)-6-ethylpyrimidine, salt with ½ formula weight of 4,4'-methylenebis(1-hydroxy-2-naphthoic acid), M.P. 253° C. (dec.).

4,4'-methylenebis(1-hydroxy-2-naphthoic acid), employed as a starting material in the above procedure, is prepared as follows: To a hot solution of 282.3 g. (1.5 mole) of 1-hydroxy-2-naphthoic acid in 3 l. of glacial acetic acid there is added with stirring 113 ml. of 37% aqueous formaldehyde followed by 75 ml. of concentrated hydrochloric acid. The mixture is stirred and heated on the steam bath for 45 minutes and cooled. The precipitate is collected by filtration, washed thoroughly with water and dried in vacuo at 55° C. Crystallization from dimethylformamide-water gives the desired intermediate as off-white crystals, M.P. 276° C. (dec.).

*Example 13*

Warm solutions of 2.01 g. (0.005 mole) of 2',7'-dichlorofluorescein and 1.24 g. (0.005 mole) of 2,4-diamino-5-(p-chlorophenyl)-6-ethylpyrimidine are mixed and the solution is cooled. The orange crystals that separate are collected by filtration, washed with methanol and dried in vacuo at 65° C. This is the desired 2,4-diamino-5-(p-chlorophenyl)-6-ethylpyrimidine, salt with 1 formula weight of 2',7'-dichlorofluorescein, M.P. indefinite beginning at >310° C.

*Example 14*

A solution of 1.24 g. (0.005 mole) of 2,4-diamino-5-(p-chlorophenyl)-6-ethylpyrimidine in 50 ml. of methanol and 10 ml. (0.01 mole) of 1 N hydrochloric acid is added to a solution of 3.12 g. (0.005 mole) of 4',5'-dibromo-2',7'-dinitrofluorescein, disodium salt in 50 ml. of water. A red precipitate forms immediately. The solid is collected by filtration, washed with water and dried in vacuo at 65° C. Crystallization from methylcellosolve-water gives the desired 2,4-diamino-5-(p-chlorophenyl)-6-ethylpyrimidine, salt with 1 formula weight of 4',5'-dibromo-2',7'-dinitrofluorescein as dark red crystals, M.P. >200° C.

*Example 15*

A solution of 1.98 g. (0.0025 mole) of 2',4',5',7'-terabromofluorescein, disodium salt in 100 ml. of water is poured into a solution of 1.24 g. (0.005 mole) of 2,4-diamino-5-(p-chlorophenyl)-6-ethylpyrimidine in 200 ml. of 50% aqueous methanol containing 5 ml. (0.005 mole) of 1 N hydrochloric acid. The orange-red precipitate that separates is collected by filtration, washed with water and dried in vacuo at 65° C. Crystallization from methylcellosolve-water gives the desired 2,4-diamino-5-(p-chlorophenyl)-6-ethylpyrimidine, salt with ½ formula weight of 2',4',5',7'-tetrabromofluorescein as red crystals, M.P. 254–257° C. (dec.).

Example 16

Hot solutions of 1.24 g. (0.005 mole) of 2,4-diamino-5-(p-chlorophenyl)-6-ethylpyrimidine and 2.45 g. (0.005 mole) of 4',5'-dibromofluorescein in methylcellosolve are mixed, diluted with water and allowed to cool. The solid that separates is collected by filtration and crystallized from methylcellosolve-water. This is the desired 2,4-diamino-5-(p-chlorophenyl)-6 - ethylpyrimidine, salt with 1 formula weight of 4',5'-dibromofluorescein, orange crystals, M.P. 293–295° C. (dec.).

Example 17

Hot solutions of 1.24 g. (0.005 mole) of 2,4-diamino-5-(p-chlorophenyl)-6-ethylpyrimidine and 2.09 g. (0.0025 mole) of 2',4',5',7'-tetraiodofluorescein in methylcellosolve are mixed, diluted with water and allowed to cool. The solid that precipitates is collected by filtration and crystallized from methylcellosolve-water. This is the desired 4,6 - diamino-5-(p-chlorophenyl)-6-ethylpyrimidine, salt with ½ formula weight of 2',4',5',7'-tetraiodofluorescein, M.P. 220–222° C. (dec.).

Example 18

A solution of 0.97 g. (0.0025 mole) of 3,1'-dihydroxy-4,4'-methylenedi-2-naphthoic acid in 25 ml. of dimethylacetamide is added to a solution of 1.24 g. (0.005 mole) of 2,4-diamino-5-(p-chlorophenyl)-6-ethylpyrimidine in 200 ml. of hot methanol. The reaction mixture is diluted with water and allowed to cool. The colorless crystals thus obtained are the desired 2,4-diamino-5-(p-chlorophenyl)-6-ethylpyrimidine salt with ½ formula weight of 3,1'-dihydroxy-4,4'-methylenedi-2-naphthoic acid, ¼ hydrate, M.P. 226–228° C. (dec.).

3,1'-dihydroxy-4,4'-methylenedi-2-naphthoic acid, employed as a starting material in the above procedure, is prepared as follows: A slurry of 20.0 g. (0.0797 mole) of 4-(chloromethyl)-3-hydroxy-2-naphthoic acid, methyl ester in 500 ml. of hot glacial acetic acid is added to a hot solution of 15.0 g. (0.0797 mole) of 1-hydroxy-2-naphthoic acid in 250 ml. of glacial acetic acid and the mixture is stirred and heated on the steam bath for 3½ hours. Upon cooling, the precipitate is collected by filtration, washed with a small portion of glacial acetic acid, and dried in vacuo at 75° C. This is the intermediate 3,1'-dihydroxy-4,4'-methylenedi-2-naphthoic acid, 2-methyl ester, M.P. 253–256° C. (dec.). The intermediate acid-ester is dissolved in 500 ml. of 1 N sodium hydroxide solution and the solution is heated on the steam bath for 2 hours and filtered. The filtrate is poured into an excess of dilute hydrochloric acid and the precipitate is collected by filtration, washed with water and dried in vacuo at 75° C. Crystallization from dimethylformamide-water gives the desired 3,1'-dihydroxy-4,4'-methylenedi-2-naphthoic acid, M.P. 255–256° C. (dec.).

Example 19

By use of the procedure described under Example 18 herein, 0.97 g. (0.0025 mole) of 3,6'-dihydroxy-4,5'-methylenedi-2-naphthoic acid and 1.24 g. (0.005 mole) of 2,4-diamino-5-(p-chlorophenyl)-6-ethylpyrimidine are combined to give the desired 2,4-diamino-5-(p-chlorophenyl)-6-ethylpyrimidine, salt with ½ formula weight of 3,6'-dihydroxy-4,5'-methylenedi-2-naphthoic acid, ¼ hydrate, as colorless crystals, M.P. 214–218° C. (dec.).

3,6'-dihydroxy-4,5'-methylenedi-2-naphthoic acid, M.P. 296–300° C. (dec.), employed as a starting material in the above procedure, is prepared from 4-(chloromethyl)-3-hydroxy-2-naphthoic acid, methyl ester and 6-hydroxy-2-naphthoic acid according to the procedures described under Example 18 herein for the preparation of 3,1'-dihydroxy-4,4'-methylenedi-2-naphthoic acid.

Example 20

Utilizing the procedure described under Example 18 herein, 2.01 g. (0.005 mole) of 4,4'-ethylidenebis(3-hydroxy-2-naphthoic acid) and 2.49 g. (0.01 mole) of 2,4-diamino-5-(p-chlorophenyl)-6-ethylpyrimidine are combined to give the desired 2,4-diamino-5-(p-chlorophenyl)-6-ethylpyrimidine, salt with ½ formula weight of 4,4'-ethylidenebis(3-hydroxy-2-naphthoic acid), as colorless crystals, M.P. 236–239° C.

4,4'-ethylidenebis(3-hydroxy-2-naphthoic acid), M.P. 264° C. (dec.), employed as a starting material in the above procedure, is prepared from 3-hydroxy-2-naphthoic acid and paraldehyde according to the procedure described under Example 12 herein for the preparation of 4,4'-methylenebis(1-hydroxy-2-naphthoic acid).

Example 21

A solution of 0.59 g. (0.00127 mole) of 4,4'-benzylidene-bis(1-hydroxy-2-naphthoic acid) in 5 ml. of dimethylacetamide and 50 ml. of methanol is added to a solution of 0.63 g. (0.00254 mole) of 2,4-diamino-5-(p-chlorophenyl)-6-ethylpyrimidine in 50 ml. of hot methanol. The reaction mixture is diluted with hot water and cooled. The insoluble product is collected by filtration, washed with water, dried in vacuo at 65° C. and crystallized from acetone-water. This is the desired 2,4-diamino-5-(p-chlorophenyl)-6-ethylpyrimidine salt with ½ formula weight of 4,4'-benzylidenebis(1-hydroxy-2-naphthoic acid), ¼ hydrate, colorless crystals, M.P. 221° C. (dec.).

4,4'-benzylidenebis(1-hydroxy-2-naphthoic acid), M.P. 303° C. (dec.), employed as a starting material in the above procedure, is prepared from 1-hydroxy-2-naphthoic acid and benzaldehyde according to the procedure described under Example 12 herein for the preparation of 4,4'-methylenebis(1-hydroxy-2-naphthoic acid).

Example 22

A solution of 1.19 g. (0.0025 mole) of 7-bromo-4,4'-methylenebis(3-hydroxy-2-naphthoic acid) in 25 ml. of dimethylacetamide is added to a hot solution of 1.24 g. (0.005 mole) of 2,4-diamino-5-(p-chlorophenyl)-6-ethylpyrimidine in 150 ml. of methanol. Upon cooling, the precipitate is collected by filtration and crystallized from acetone-water. This is the desired 2,4-diamino-5-(p-chlorophenyl)-6-ethylpyrimidine, salt with ½ formula weight of 7 - bromo - 4,4' - methylenebis(3-hydroxy-2-naphthoic acid), ¾ hydrate, as off-white crystals, M.P. 222–225° C.

7 - bromo-4,4'-methylenebis(3-hydroxy - 2 - naphthoic acid), M.P. 305–307° C., employed as a starting material in the above procedure, is prepared from 4-(chloromethyl)-3-hydroxy-2-naphthoic acid, methyl ester and 7-bromo-3-hydroxy-2-naphthoic acid according to the procedure described under Example 18 herein for the preparation of 3,1'-dihydroxy-4,4'-methylenedi-2-naphthoic acid.

Example 23

Utilizing the procedure described under Example 22 herein, 1.19 g. (0.0025 mole) of 7-bromo-3,1'-dihydroxy-4,4'-methylenedi-2-naphthoic acid and 1.24 g. (0.005 mole) of 2,4-diamino-5-(p-chlorophenyl)-6-ethylpyrimidine are allowed to react to give the desired 2,4-diamino-5-(p-chlorophenyl)-6-ethylpyrimidine, salt with ½ formula weight of 7-bromo-3,1'-dihydroxy-4,4'-methylenedi-2-naphthoic acid, off-white crystals, M.P. 228–232° C., from acetone-water.

7-bromo - 3,1'-dihydroxy-4,4'-methylenedi-2-naphthoic acid, employed as a starting material in the above procedure, is prepared as follows: A mixture of 28.1 g. (0.10 mole) of 7-bromo-3-hydroxy-2-naphthoic acid, methyl ester, 25 ml. (0.33 mole) of formalin and 200 ml. of concentrated hydrochloride acid is allowed to stand at room temperature for 2 days with occasional shaking. The precipitate is collected by filtration, dried in vacuo at 45° C. and crystallized from ethyl acetate. This product, M.P. 191–200° C., is the intermediate 7-bromo-4-(chloromethyl)-3-hydroxy-2-naphthoic acid, methyl ester, which is subsequently allowed to react with 1-hydroxy-2- naphthoic according to the procedure described under Example 18 herein for the preparation of 3,1'-dihydroxy-4,4'-methylenedi-2-naphthoic acid.

Example 24

Utilizing the procedure described under Example 22 herein, 1.19 g. (0.0025 mole) of 7-bromo-3,6'-dihydroxy-4,5'-methylenedi-2-naphthoic acid and 1.24 g. (0.005 mole) of 2,4-diamino-5-(p-chlorophenyl)-6-ethylpyrimidine are allowed to react to give the desired 2,4-diamino-5-(p-chlorophenyl)-6-ethylpyrimidine, salt with ½ formula weight of 7-bromo-3,6'-dihydroxy-4,5'-methylenedi-2-naphthoic acid, off-white crystals, M.P. 234–237° C., from acetone-water.

7-bromo-3,6'-dihydroxy-4,5'-methylenedi-2-naphthoic acid, employed as a starting material in the above procedure, is prepared from 7-bromo-4-(chloromethyl)-3-hydroxy-2-naphthoic acid, methyl ester and 6-hydroxy-2-naphthoic acid according to the procedure described under Example 23 herein for the preparation of 7-bromo-3,1'-dihydroxy-4,4'-methylenedi-2-naphthoic acid.

Example 25

Utilizing the procedure described under Example 8 herein, 0.82 g. (0.0025 mole) of fluorescin and 0.62 g. (0.0025 mole) of 2,4-diamino-5-(p-chlorophenyl)-6-ethylpyrimidine are allowed to react to give the desired 2,4-diamino-5-(p-chlorophenyl)-6-ethylpyrimidine, salt with 1 formula weight of fluorescin, as yellow crystals from dimethylacetamide-water, M.P. >160° C.

We claim:

A salt of 2,4-diamino-5-(p-chlorophenyl)-6-ethylpyrimidine with one formula weight of fluorescein.

References Cited in the file of this patent

UNITED STATES PATENTS

| | | |
|---|---|---|
| 1,872,826 | Schulemann et al. | Aug. 23, 1932 |
| 2,576,939 | Hitchings et al. | Dec. 4, 1951 |

OTHER REFERENCES

Barber et al.: J. Applied Chemistry, vol. 2, pp. 565–75 (1952).

Burger et al.: Medical Chemistry (New York, 1960), pp. 46–47.